(12) United States Patent
Tamura et al.

(10) Patent No.: US 10,604,973 B2
(45) Date of Patent: Mar. 31, 2020

(54) VEHICLE UPPER DOOR LATCH DEVICE (71) Applicant: MITSUI KINZOKU ACT CORPORATION, Yokohama-shi, Kanagawa (JP)

(72) Inventors: Shunsuke Tamura, Yokohama (JP); Shintaro Okawa, Yokohama (JP); Toshio Takenaka, Yokohama (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 337 days.

(21) Appl. No.: 15/529,140

(22) PCT Filed: Dec. 3, 2014

(86) PCT No.: PCT/JP2014/081993
§ 371 (c)(1),
(2) Date: May 24, 2017

(87) PCT Pub. No.: WO2016/088222
PCT Pub. Date: Jun. 9, 2016

(65) Prior Publication Data
US 2017/0260779 A1   Sep. 14, 2017

(51) Int. Cl.
*E05B 83/38* (2014.01)
*E05B 79/20* (2014.01)
(Continued)

(52) U.S. Cl.
CPC .............. *E05B 83/38* (2013.01); *B60J 5/04* (2013.01); *B60J 5/0479* (2013.01); *E05B 79/08* (2013.01); *E05B 79/20* (2013.01); *E05B 81/66* (2013.01)

(58) Field of Classification Search
CPC .......... E05B 83/38; E05B 83/42; E05B 83/44; E05B 79/00; E05B 79/08; E05B 79/20;
(Continued)

(56) References Cited

U.S. PATENT DOCUMENTS

| 4,505,500 A | 3/1985 | Utsumi et al. |
| 5,000,495 A * | 3/1991 | Wolfgang ........... B29C 45/1676 292/216 |

(Continued)

FOREIGN PATENT DOCUMENTS

| FR | 2 927 348 A1 | 8/2009 |
| JP | 58-50268 A | 3/1983 |

(Continued)

OTHER PUBLICATIONS

International Search Report Corresponding to PCT/JP2014/081993 dated Mar. 17, 2015.

(Continued)

*Primary Examiner* — Nathan Cumar
(74) *Attorney, Agent, or Firm* — Davis & Bujold PLLC; Michael J. Bujold (57) ABSTRACT

An upper door latch device for a vehicle is provided which satisfies the requirements of strength and is lightweight. A reinforcement flange section (261) extends downward from an extension section of a striker entry groove (26a), into which a striker enters, and bent forward at a right angle, or at substantially at a right angle, is provided at a side edge of a front base plate (26), which faces outside of the vehicle. A front mounting section (262) is provided continuous with the lower part of the reinforcement flange section (261).

7 Claims, 9 Drawing Sheets

(51) Int. Cl.
*B60J 5/04* (2006.01)
*E05B 79/08* (2014.01)
*E05B 81/66* (2014.01)

(58) Field of Classification Search
CPC .......... E05B 81/66; E05B 81/68; E05B 79/06;
B60J 5/04; B60J 5/0401; B60J 5/0479;
B60J 5/0477
USPC ........................................................ 292/195
See application file for complete search history.

(56) References Cited

U.S. PATENT DOCUMENTS

| | | | | |
|---|---|---|---|---|
| 6,019,402 | A * | 2/2000 | Arabia, Jr. .............. | E05B 81/06 292/201 |
| 2005/0092045 | A1* | 5/2005 | Dimig .................... | E05B 77/30 70/277 |
| 2005/0140148 | A1* | 6/2005 | Stoof ...................... | E05B 17/04 292/216 |
| 2007/0182165 | A1* | 8/2007 | Yoshikuwa ............. | E05B 83/36 292/216 |

FOREIGN PATENT DOCUMENTS

| | | |
|---|---|---|
| JP | 2002-200920 A | 7/2002 |
| JP | 4203881 B2 | 1/2009 |
| JP | 2013-014943 A | 1/2013 |

OTHER PUBLICATIONS

Written Opinion Corresponding to PCT/JP2014/081993 dated Mar. 17, 2015.

* cited by examiner

VEHICLE UPPER DOOR LATCH DEVICE

TECHNICAL FIELD

The present invention relates to a vehicle upper door latch device provided in an upper portion of a double hinged door provided in a vehicle body.

BACKGROUND OF THE INVENTION

For example, as described in Patent Literature 1, in such as a pickup truck having a bed at a rear portion of the vehicle body, on a side surface of the vehicle body, a front door pivotally mounted by a hinge at a front end side and a rear door pivotally mounted by a hinge at a rear end side are often provided so that they can be opened and closed in a double hinged manner. In a vehicle having such the door opened and closed in a double hinged manner, it is common that the rear door is closed and is locked to the vehicle body, and then the front door is closed and can be locked to the rear door. On upper and lower portions of a front portion of the rear door, an upper door latch device (an upper latch unit) and a lower door latch device (a lower latch unit) that lock the rear door in a closed state by engaging with a striker provided on a roof side and a lower side portion of the vehicle body are provided respectively.

In addition, as described in Patent Literature 2, for example, an upper door latch device (an upper lock unit) that engages with a striker provided at a side end of a roof side of a vehicle body is provided on an upper portion of a front side door.

Moreover, a conventional upper door latch device comprises a pair of front and rear base members, a latch pivotally mounted on a latch shaft fixed by caulking to both base members and engageable with a striker provided on a roof side of a vehicle body, and a ratchet pivotally mounted on a ratchet shaft fixed by caulking to the front and rear base members and engageable with the latch, wherein the front and rear base members are fixed to an upper portion of an inner panel of the door.

PRIOR ART

Patent Literatures

Patent Literature 1: JP2002-200920A
Patent Literature 2: JP4203881B2

SUMMARY OF THE INVENTION

Problem to be Solved by the Invention

As described above, in the upper door latch device provided on the upper portion of the door, since the striker with which the latch is engaged is fixed to the roof side of the vehicle body, a U-shaped leg portion of the striker protrudes from the roof side toward the door. Therefore, for example, at the time of a vehicle collision, when deformation occurs such that the upper portion of the vehicle body and the door are displaced relatively in a front-rear direction, the upper door latch device and the leg portion of the striker engaged with the latch move relatively in the front-rear direction.

In such a case, malfunctions may occur such that the door cannot be opened by the striker biting an edge of the inner panel of the door, and a part of the constituent members is deformed or damaged by applying the large tensile load in the front-rear direction or the outward direction of the vehicle to the latch shaft and the base member through the latch engaging with the striker.

In view of such a problem, in the upper door latch device described in Patent Literature 2, countermeasures have been taken to fix a biting prevention bracket that prevents a deformation of the striker in the front direction on the inner panel of the door, and to prevent the striker from biting into the door panel at the time of a crash.

However, none of the above-mentioned Patent Literatures 1 and 2 discloses a means capable of preventing or restricting such as deformation and breakage of the constituent members of the upper door latch device. Therefore, at the time of a vehicle collision, through strikers, when a large tensile load in the front-rear direction or the outward direction of the vehicle (the direction in which the latch is pulled by the striker) is input to the upper door latch device, it is conceivable that a large bending load is applied to a part of the constituent members of the upper door latch device, particularly the front and rear base members fixed to the inner panel of the door, and malfunctions such as deforming and breakage may occur.

As a means for preventing this, it is conceivable to increase the bending rigidity of the front and rear base members by increasing a thickness of the front and rear base members, or by welding a reinforcing plate. However, if the thickness of the base members is increased, the upper door latch device becomes larger and the mass increases, and further if the reinforcing plate is added, the welding process and the manufacturing process of the reinforcing plate increase, so that a problem of high cost arises.

Furthermore, if the bending rigidity of the base member is increased, the base member is less likely to be deformed, but the load concentrates on the latch shaft fixed by caulking to the base member, and stress concentrates near the caulked portion of the latch shaft. Then there is a risk that the part is broken.

In view of the above problems, it is an object of the present invention to provide a vehicle upper door latch device which becomes possible to be made lightweight while maintaining strength requirements.

Means for Solving the Problems

According to the present invention, the above problems are solved in the following manner.

A first invention is a vehicle upper door latch device provided in an upper part of a double hinged door provided in a vehicle body, the device comprising:
  a body;
  a first metal base member provided on one side of the body and having a first mounting portion that can be fixed to the door;
  a second metal base member provided on the other side of the body and having a second mounting portion that can be fixed to the door;
  a latch shaft passing through the body and having both ends supported by the first base member and the second base member;
  a latch being disposed in the body, pivotally mounted on the latch shaft and engageable with a striker on a side of the vehicle body;
  a ratchet shaft having both ends supported by the first base member and the second base member; and
  a ratchet disposed in the body, pivotally mounted on the ratchet shaft and engageable with the latch, wherein the first base member has a reinforcing flange extending downward from an extension portion of a striker entering groove into which the striker enters, the reinforcing flange is bent at a right angle or substantially right angle to an entry direction of the striker into the striker entering groove, and the first mounting portion is continuous with a lower portion of the reinforcing flange.

A second invention is the vehicle upper door latch device in the first invention wherein both ends of the latch shaft and the ratchet shaft are fixed by caulking to the first base member and the second base member respectively.

A third invention is the vehicle upper door latch device in the first or second invention wherein the first base member is formed by a single member including the first mounting portion and the second base member is formed by a single member including the second mounting portion.

A forth invention is the vehicle upper door latch device in any one of the first to third invention wherein a metal cover member covering one side of the body is disposed between the first base member and the body, and a support portion for supporting an upper portion of a motion transmitting member for rotating the ratchet in a direction to release engagement with the latch is provided at a lower portion of the cover member.

A fifth invention is the vehicle upper door latch device in the fourth invention wherein upper end portions of the body, the first base member, the cover member, and the second base member are connected by a connecting shaft in which both ends are fixed by caulking to the first base member and the second base member.

A sixth invention is the vehicle upper door latch device in the fifth invention wherein at least one of the first base member, the cover member, and the second base member is formed of a high tensile steel plate.

A seventh invention is the vehicle upper door latch device in any one of the first to sixth invention wherein a third mounting portion extending toward the first base member side and located below the first mounting portion is integrally formed with a lower portion of the second base member.

Advantages of the Invention

According to the present invention, a reinforcing flange extending downward from an extension portion of a striker entering groove, the reinforcing flange bent at a right angle or substantially right angle to an entry direction of the striker into the striker entering groove, wherein the reinforcing flange is provided on the first base member so as to be continuous with the first mounting portion, so that the bending rigidity of the first base member including the first mounting portion is increased. As a result, in particular, when a large tensile load is applied from the striker to the upper door latch device at the time of a vehicle collision, the first base member fixed to the door is prevented from being excessively deformed and damaged. Therefore, there is no need to increase the bending rigidity of the first base member by making the thickness of the first base member more than necessary or by welding the reinforcing plate to the first base member, while maintaining the strength requirements for the upper door latch device, it becomes possible to downsize and be made lightweight, and further the welding process and the manufacturing process of the reinforcing plate becomes unnecessary, so that the cost can be reduced.

EMBODIMENTS OF THE INVENTION

One embodiment of the present invention will be described with reference to the drawings.

Figure 1:
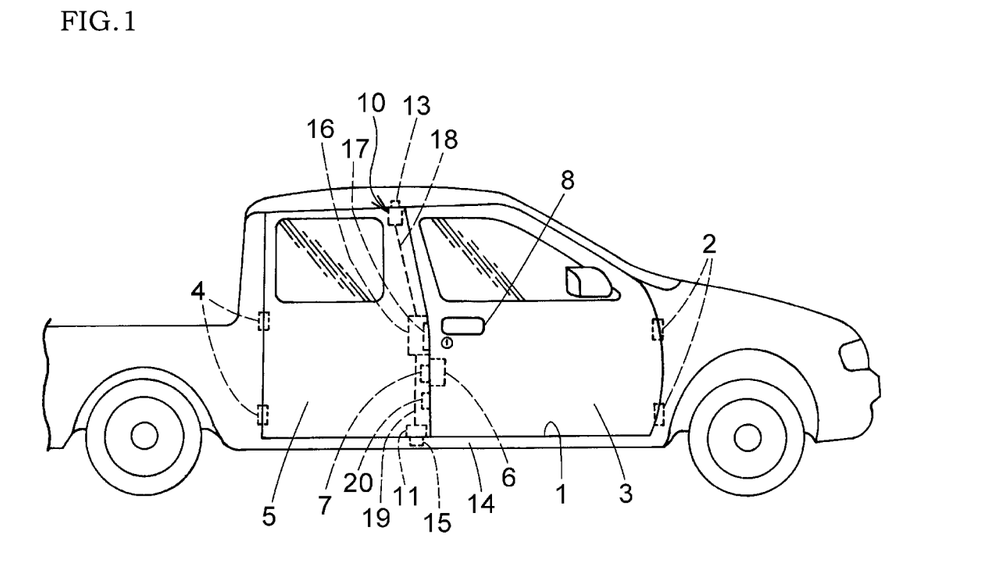
FIG. 1 is a side elevational view of a vehicle comprising a vehicle upper door latch device of the present invention.

FIG. 1 is a side elevational view of a pickup truck comprising a vehicle upper door latch device according to the present invention (hereinafter referred to as the upper door latch device). In a getting on/off opening 1 on the side surface of the vehicle body, a front door 3 in which a front end is supported with a pair of upper and lower front door hinges 2, 2 at a front edge of the getting on/off opening 1, and a rear door 5 in which a rear end is pivotally mounted by a pair of upper and lower rear door hinges 4, 4 at a rear edge of the getting on/off opening 1 are mounted so that they can be opened in a double hinged manner toward the vehicle body exterior side.

A latch (not shown) of the front door latch device 6 provided at the rear end portion of the inner panel (not shown) of the front door 3 is engaged with a middle striker 7 (refer to FIG. 2) fixed to the front face of the rear door 5 in the closed position, so that the front door 3 is held in the closed position. When the front door latch device 6 is in the unlocked state, the front door 3 can be opened by an outside handle 8 and an inside handle (not shown) on the door inside the vehicle.

Figure 2:
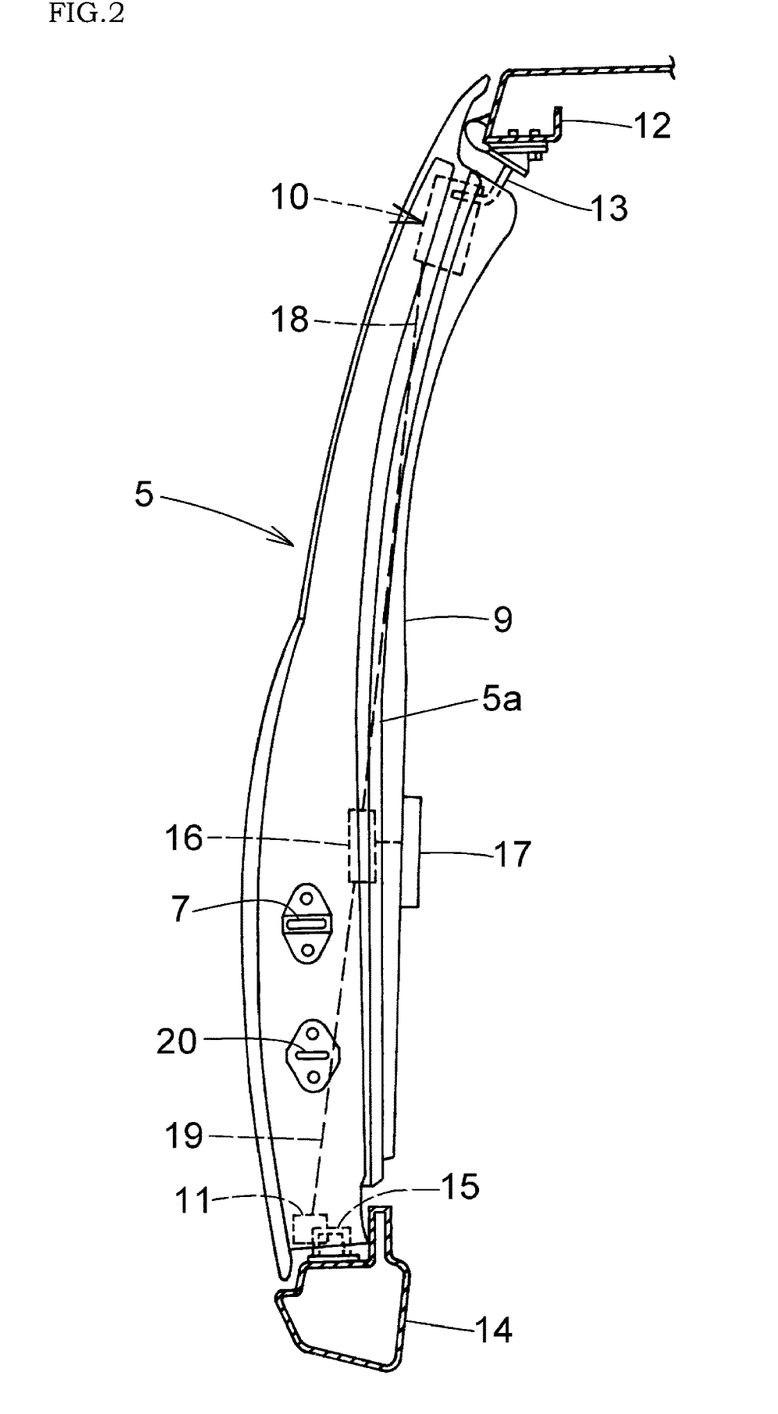
FIG. 2 is a front elevational view of a rear door provided with the vehicle upper door latch device viewed from the front of the vehicle.

As also shown enlarged in FIG. 2, the upper door latch device 10 is provided at a front upper portion of an inner side surface of an inner panel 5a of the rear door 5 whose side surface on the vehicle interior side is covered with an interior trim 9, and in the rear door 5, a lower door latch device 11 is provided at a front lower portion of the inner panel 5a. When the rear door 5 is closed, the upper door latch device 10 and the lower door latch device 11 are engaged respectively with a upper striker 13 bolted to a roof side rail 12 of the vehicle body and a lower striker 15 bolted to a upper surface of a rocker panel 14 at a lower portion of the vehicle body, and the rear door 5 is held in the closed position. Since the lower door latch device 11 comprises a latch (not shown) engageable with the lower striker 15 and a ratchet (not shown) engageable with the latch and is known, and is not directly related to the present invention, its detailed description will be omitted.

An intermediate operating device 16 for unlatching the upper door latch device 10 together with the lower door latch device 11 is provided at an intermediate portion in a vertical direction of a front end of the inner panel 5a in the rear door 5. The intermediate operating device 16 is linked to an opening handle 17 mounted to the inner panel 5a of the rear door 5 and operated when the front door 3 is opened.

The intermediate operating device 16 comprises an opening lever (not shown) that rotates with opening operation of the opening handle 17, and a ratchet release lever (not shown) rotated in the vertical direction in association with the opening lever, and connected to the upper door latch device 10 and the lower door latch device 11 through a upper Bowden cable 18 and a lower Bowden cable 19 which are the motion transmitting member. Further, on a front end surface of the rear door 5, when the rear door 5 is in the closed state, the aforementioned middle striker 7 with which the front door latch device 6 can engage and a door detection lever 20 located below the middle striker 7 are provided.

The door detection lever 20 prevents the upper door latch device 10 and the lower door latch device 11 from becoming in an unlatched state by releasing the linkage state between the opening lever and the ratchet release lever of the intermediate operating device 16 by the door detection lever 20 being pushed in the rear direction when closing the front door 3. That is, when the front door 3 is closed, the rear door 5 cannot be opened even when the opening handle 17 is operated to open from the vehicle interior side, only when the front door 3 is opened, the rear door 5 can be opened by bringing the upper door latch device 10 and the lower door latch device 11 into an unlatched state by opening operation of the opening handle 17. In addition, the detailed description of its constituent members will be omitted since the intermediate operating device 16 does not directly relate to the present invention.

Next, referring to FIGS. 3 to 9, the upper door latch device 10 according to the present invention provided in the rear door 5 will be described in detail.

Figure 3:
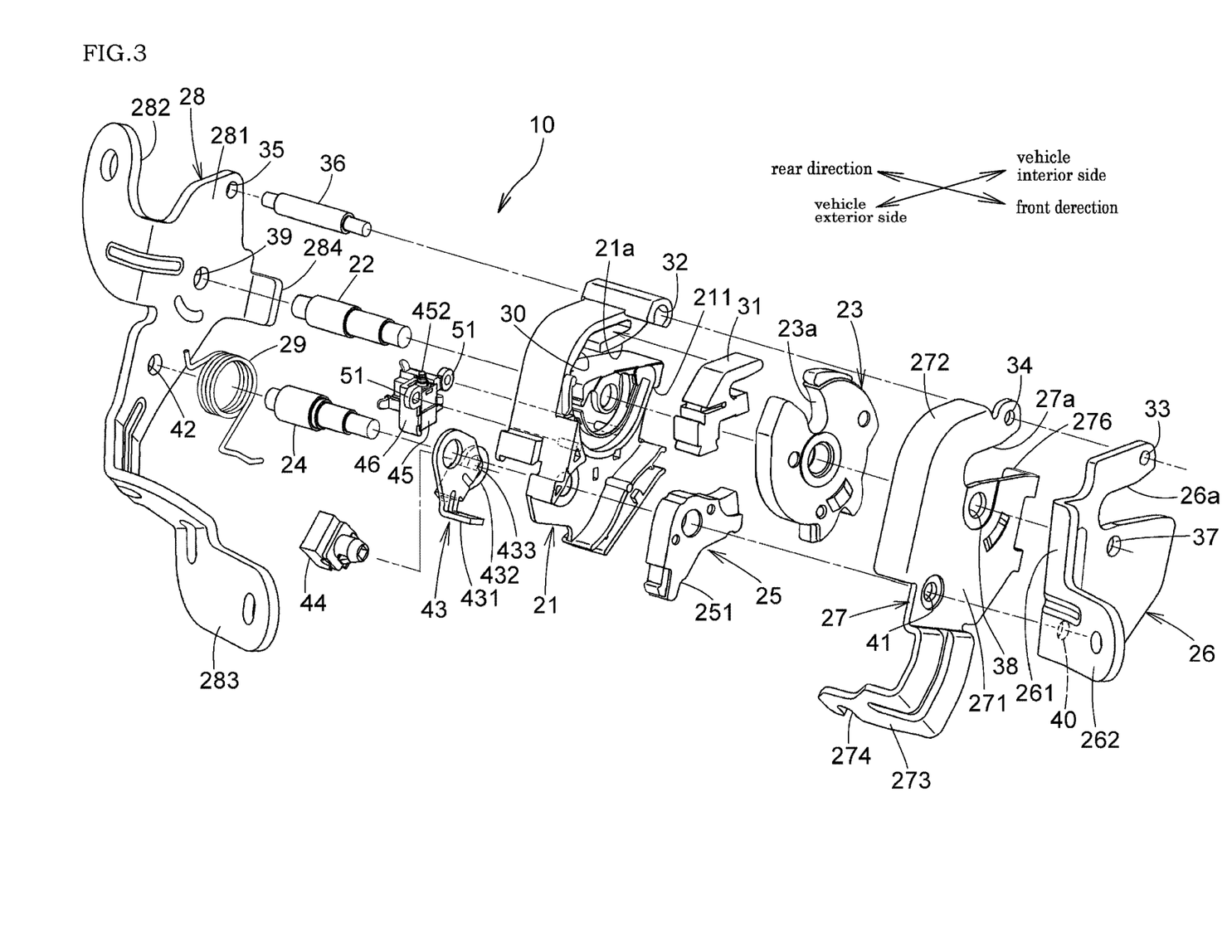
FIG. 3 is an exploded perspective view of the vehicle upper door latch device.
Figure 4:
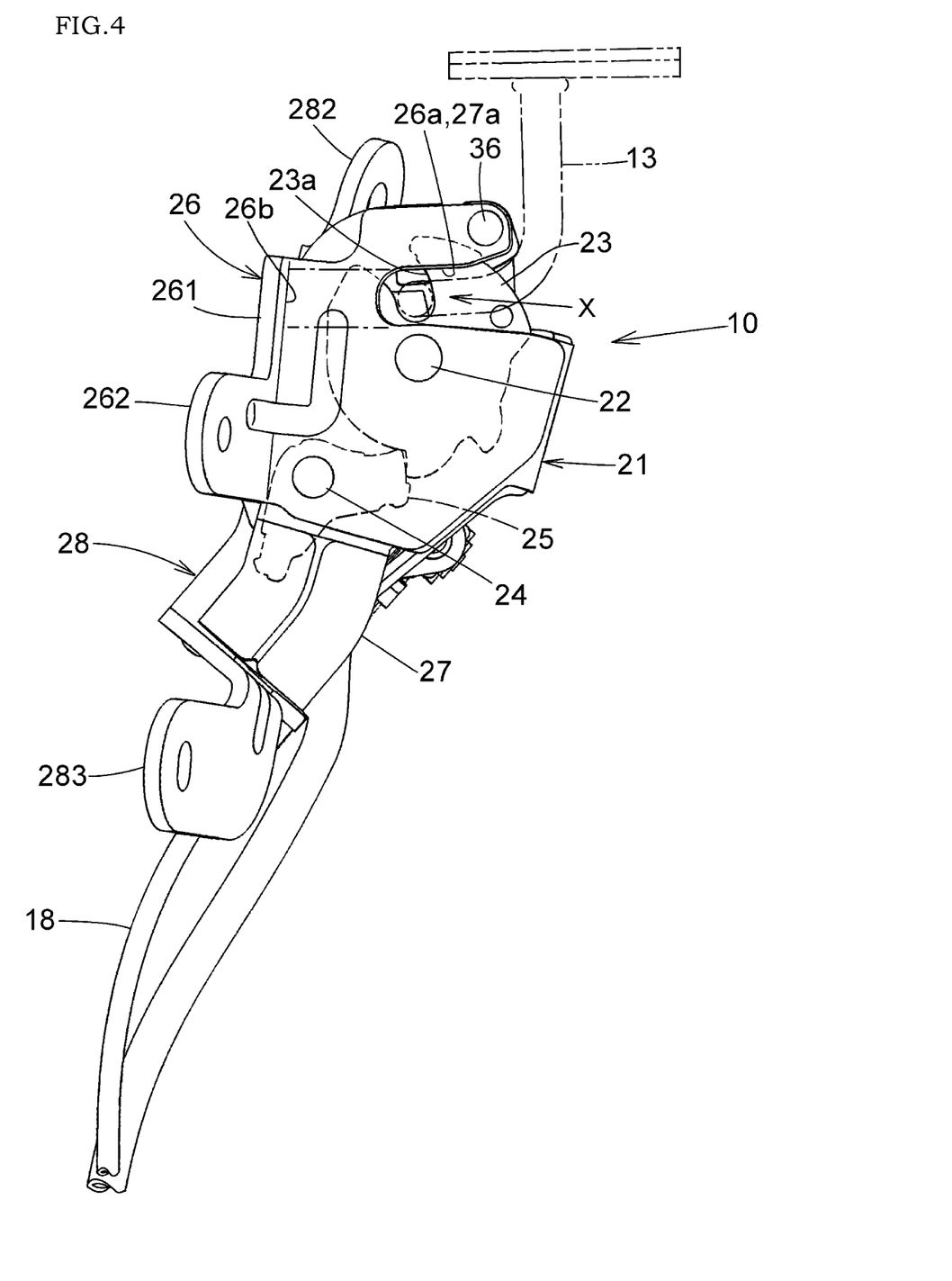
FIG. 4 is a front elevational view of the vehicle upper door latch device viewed from the front of the vehicle.

The upper door latch device 10 comprises:

a synthetic resin body 21 having a striker entering groove 21a that is open to the vehicle interior side into which the above-mentioned upper striker 13 can enter;

a latch 23 pivotally mounted on the latch shaft 22 extending in the front-rear direction passing through the body 21 and having an engaging groove 23a engageable with the upper striker 13, at the inside of the front side of the body 21;

a ratchet 25 pivotally mounted by a ratchet shaft 24 extending in the front-rear direction passing through the body 21 and engageable with a latch 23 engaged with the upper striker 13, at the inside of the front side of the body 21 under the latch 23;

a metal front base member 26 fixed to the front side of the body 21 and having a striker entering groove 26a in the upper part thereof;

a metal cover member 27 provided between the body 21 and the front base member 26 so as to cover the front side of the body 21 and having a striker entering groove 27a in the upper part thereof; and a metal rear base member 28 covering the rear side of the body 21.

In the present embodiment, the front base member 26, the cover member 27, and the rear base member 28 are each formed of a high tensile steel plate, for example. The front base member 26 and the rear base member 28 correspond to the first base member and the second base member in the present invention respectively.

The latch 23 is urged by a spring (not shown) in an opening direction (clockwise in FIG. 4) capable of releasing the upper striker 13. In addition, the ratchet 25 is wound on the ratchet shaft 24, and is engaged with the outer peripheral portion of the latch 23 by the spring 29 whose one end is retained by the ratchet 25 and the other end is retained by the body 21, and is urged in a direction (counterclockwise in FIG. 4) to prevent the latch 23 from rotating in the opening direction.

A bumper rubber 31 which serves as a buffering action when the upper striker 13 enters is incorporated in a bumper rubber hole 30 on the vehicle exterior side continuous with the striker entering groove 21a formed in the body 21.

Shaft holes 32, 33, 34, 35 in the front-rear direction are respectively formed at upper end portions on the vehicle interior side of the body 21, the front base member 26 and the cover member 27, and at an upper end portion of the rear base member 28. By caulking a protruding end portions (the both ends protruding from the front base member 26 and the rear base member 28) of the connecting shaft 36 that is inserted through the shaft holes 32 to 35 and that faces in the front-rear direction, upper end portions of the body 21, the front base member 26, the cover member 27, and the rear base member 28 are firmly connected to each other by the connecting shaft 36.

In addition, the above-described latch shaft 22 passing through the body 21 and the latch 23 is inserted through shaft holes 37, 38, 39 formed in the intermediate portions in the vertical direction of the front base member 26, the cover member 27 and the rear base member 28. By caulking projecting end portions of the latch shaft 22 from the front base member 26 and the rear base member 28, intermediate portions of the body 21, the front base member 26, the cover member 27, and the rear base member 28 in the vertical direction are firmly connected to each other by the latch shaft 22.

Further, shaft holes 40, 41, and 42 through which the both ends of the ratchet shaft 24 are inserted are formed below the shaft holes 37 to 39 in the front base member 26, the cover member 27, and the rear base member 28. By caulking protruding end portions of the ratchet shaft 24 from the front base member 26 and the rear base member 28, a portion below the latch shaft 22 of the body 21, the front base member 26, the cover member 27, and the rear base member 28 is firmly connected by the ratchet shaft 24.

A release member 43 is pivotally mounted on the ratchet shaft 24 between the body 21 and the rear base member 28. The release member 43 is integrally formed with a release operating portion 431 which can contact with the release action portion 251 of the ratchet 25 from the release rotation direction (the direction in which the ratchet 25 is disengaged from the latch 23). In addition, a drive lever portion 432 is formed on the release member 43, in the fitting hole 433 provided in the driving lever portion 432, a coupling member 44 mounted to an upper end portion of an inner cable 181 projecting from the upper end of the upper Bowden cable 18 connected to the ratchet release lever of the intermediate operating device 16 is fitted (refer to FIGS. 7 and 8).

In the latched state where the latch 23 engages with the upper striker 13, when the above-described opening handle 17 is operated to open the door, the release member 43 is rotated clockwise as viewed from the front through the inner cable 181 of the upper Bowden cable 18 connected to the ratchet release lever of the intermediate operating device 16 and the connecting member 44 mounted to the inner cable 181, the ratchet 25 is also rotated clockwise as viewed from the front through the release operating portion 431. As a result, the engagement state between the latch 23 and the ratchet 25 is released, and the latch 23 rotates in the open direction (clockwise in FIG. 4) releasing the upper striker 13 by the biasing force of the spring, whereby the upper door latch device 10 is in an unlatched state. In addition, when the opening handle 17 is operated to open, as described above, the lower door latch device 11 also becomes an unlatched state by the intermediate operating device 16, so that the rear door 5 can be opened.

On the upper half portion of the side edge of the vehicle exterior side of the front base member 26, the reinforcing flange 261 of an appropriate size which is at a right angle or substantially right angle to the entry direction X (refer to FIG. 4) of the upper striker 13 into the striker entering groove 26a, and which is bent in the front direction is formed integrally toward the lower side (the direction of the ratchet 25) from the extension portion 26b of the striker entering groove 26a which is the entry direction of the upper striker 13. Further, on the lower half portion of the side edge of the vehicle exterior side of the front base member 26, for fixing the upper door latch device 10 to the inner panel 5a of the rear door 5, the first front side mounting portion 262 which is longer than the reinforcing flange 261 in the front direction is formed at substantially right angle in the front direction so as to be continuous with the lower end portion of the reinforcing flange 261. In addition, the first front side mounting portion 262 corresponds to the first mounting portion according to the present invention.

As described above, when the reinforcing flange 261 extending downward from the extension portion 26b of the striker entering groove 26a in the front direction is provided so as to be continuous with the first front side mounting portion 262 at the side edge of the vehicle exterior side of the front base member 26 made of a high tensile steel plate, the strength of the front base member 26 is increased. In particular, the bending rigidity of the side end portion of the vehicle exterior side of the front base member 26 including the first front side mounting portion 262 which is the fixed portion side to the inner panel 5a of the rear door 5 can be increased.

The cover member 27 comprises:

a body front surface covering portion 271 provided so as to overlap the rear surface of the front base member 26, and closing the front surface of the body 21 formed substantially in the same shape;

a curved body outer peripheral surface covering portion 272 formed on the side edge and the upper edge of the vehicle exterior side of the body front surface covering portion 271 which is the extending direction of the striker entering groove 27a, and covering the upper half outer peripheral surface and the upper surface of the vehicle exterior side of the body 21; and a cable support portion 273 bent slightly in the front direction from the lower end of the body front surface covering portion 271, and then extended downward, and extended further in the rear direction from the lower end.

Figure 7:
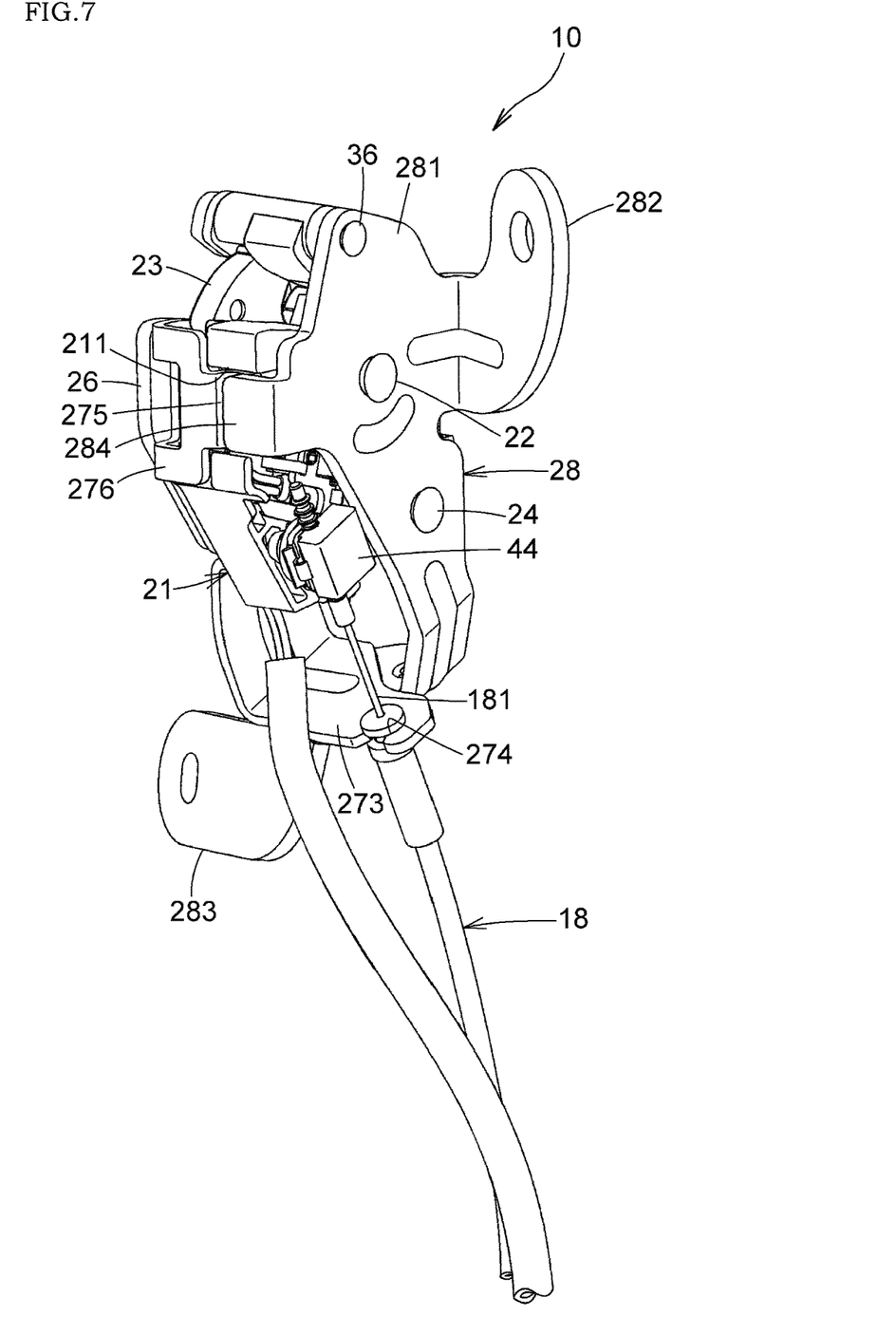
FIG. 7 is a perspective view of the vehicle upper door latch device viewed from the vehicle interior side.

A support groove 274 in which the upper end portion of the above-described upper Bowden cable 18 is supported is provided at the rear end portion which is the end portion of the cable support portion 273 (refer to FIG. 7).

In addition, on the side edge of the vehicle interior side of the body front surface covering portion 271 of the cover member 27, as shown in FIG. 7, a U-shaped latch protecting portion 276 bent in the rear direction so as to partially cover the surface of the vehicle interior side of the latch 23, and having a body protecting portion 275 fitted in a recessed portion 211 formed in the surface of the vehicle interior side of the body 21 at the tip portion (rear end portion) is formed. In this way, on the side edge of the vehicle exterior side and the vehicle interior side of the body front surface covering portion 271 of the cover member 27, since the curved body outer peripheral surface covering portion 272 and the U-shaped latch protecting portion 276 looking the rear direction respectively are provided, the bending rigidity of the cover member 27 is increased.

Figure 5:
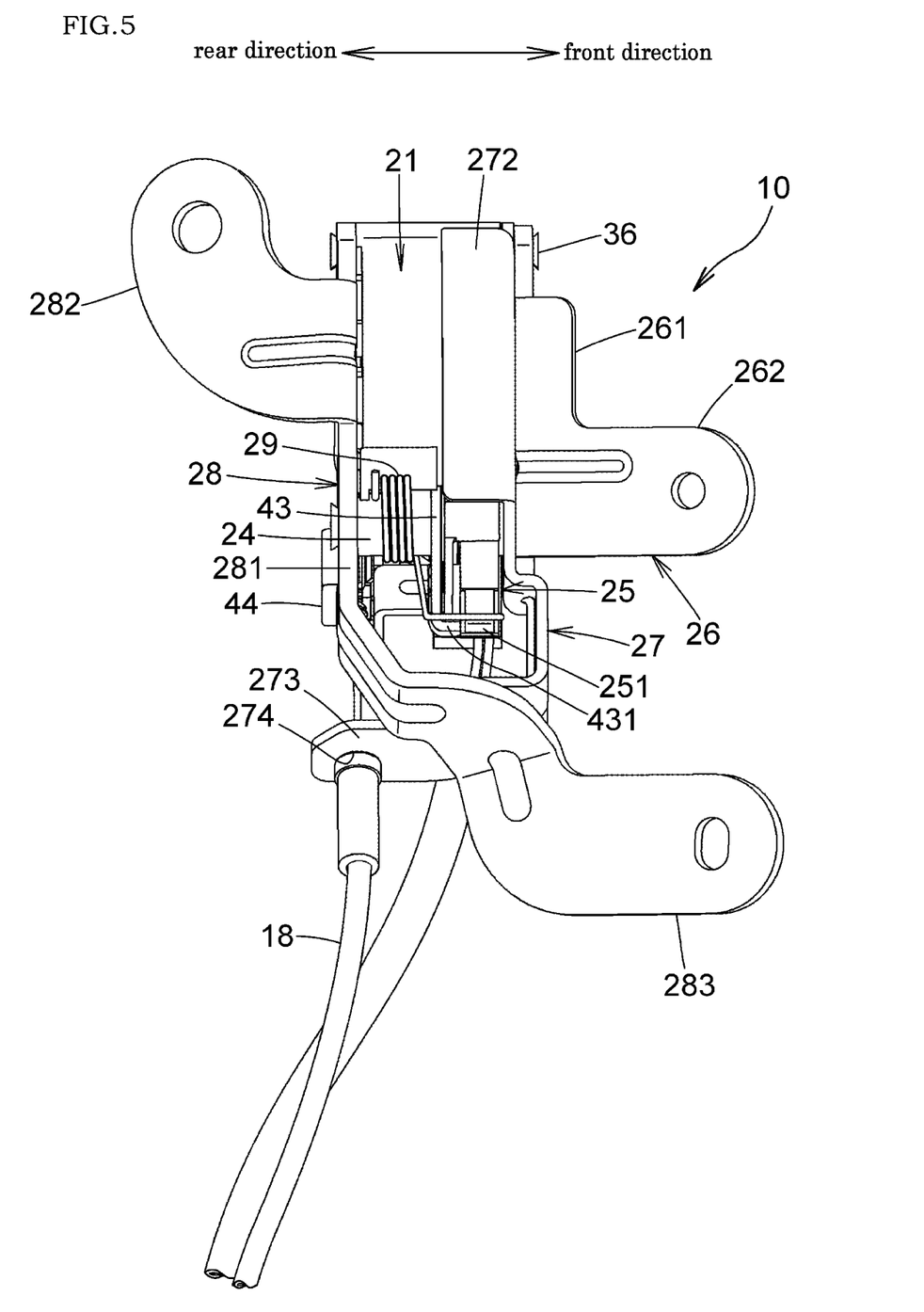
FIG. 5 is a side elevational view of the vehicle upper door latch device viewed from the vehicle exterior side.
Figure 6:
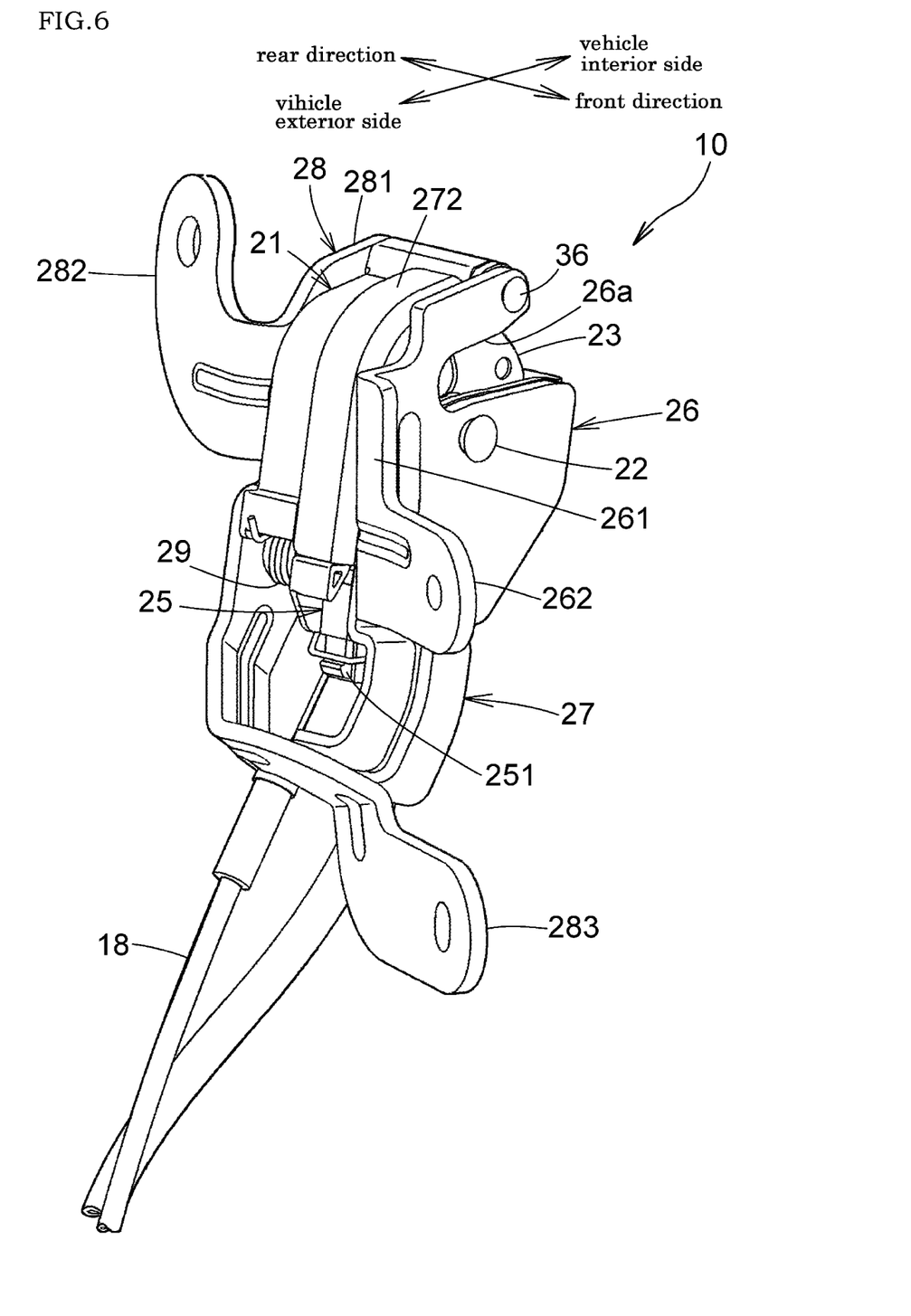
FIG. 6 is a perspective view of the vehicle upper door latch device viewed from the vehicle exterior side.

The rear base member 28 comprises (refer to FIG. 5):

a body rear surface covering portion 281 partially exposing and covering the vehicle interior side on the rear surface of the body 21;

a rear side mounting portion 282 extending in the rear direction from a side edge of the vehicle exterior side of the body rear surface covering portion 281 and fixing the upper door latch device 10 to the inner panel 5a of the rear door 5; and a second front side mounting portion 283 extending downward the lower portion of the body rear surface covering portion 281 so as to be inclined slightly to the vehicle exterior side, then bending in the front direction in a lower part spaced apart the body 21, bent downward at the front end, further extending in the front direction, positioning below the above first front side mounting portion 262.

In addition, the rear side mounting portion 282 and the second front side mounting portion 283 are correspond to the second mounting portion and the third mounting portion according to the present invention respectively.

On the side edge of the vehicle interior side of the body rear surface covering portion 281 of the rear base member 28, a body protecting portion 284 which is bent in the front direction and overlaps the side surface of the vehicle interior side of the body protecting portion 275 of the cover member 27 is formed (refer to FIG. 7). The upper door latch device 10 is mounted by fixing the first front side mounting portion 262, the second front side mounting portion 283, and the rear mounting portion 282 with bolts from the vehicle interior side on the front upper portion of the inner panel 5a of the rear door 5.

Figure 8:
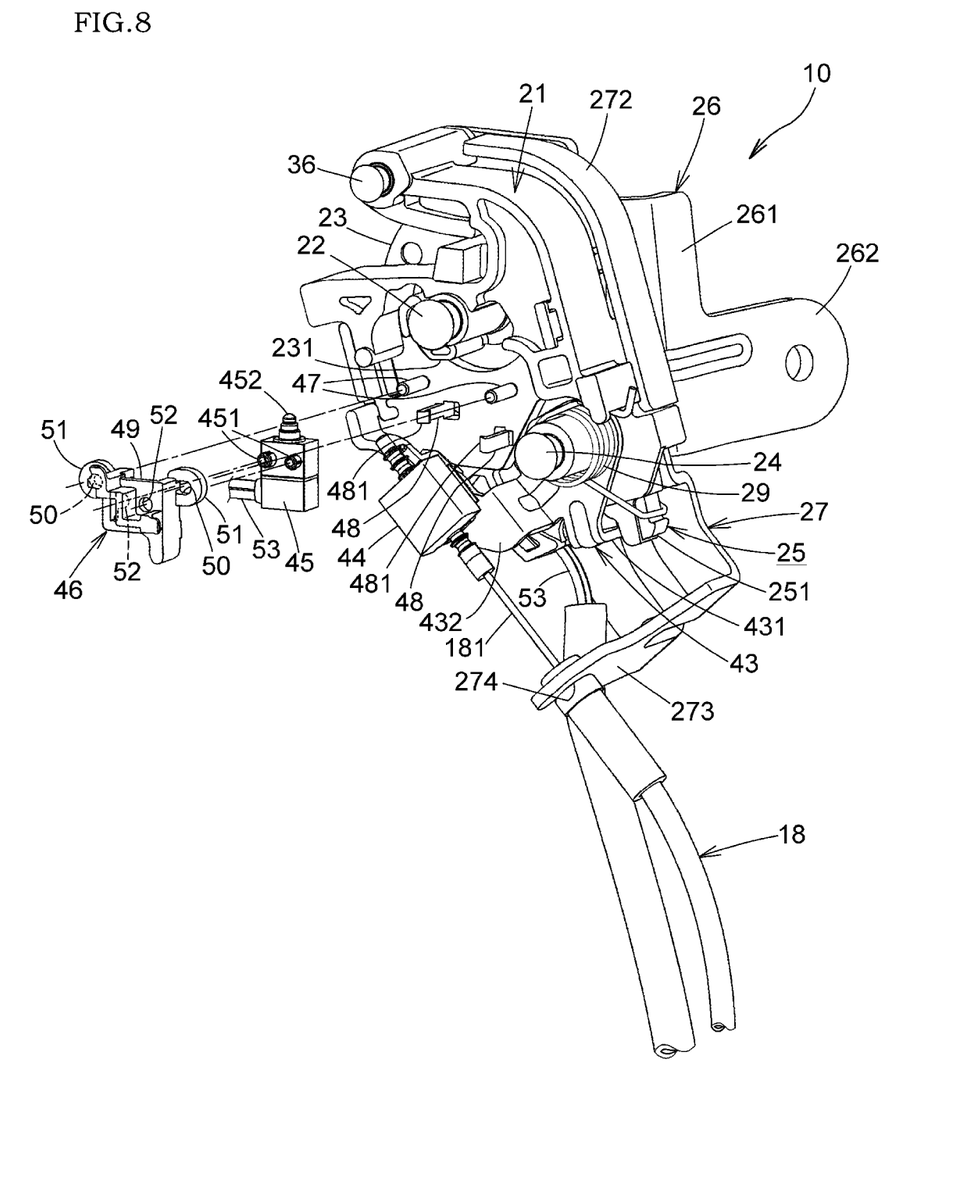
FIG. 8 is a perspective view of the vehicle upper door latch device viewed from the vehicle exterior side before mounting a limit switch.
Figure 9:
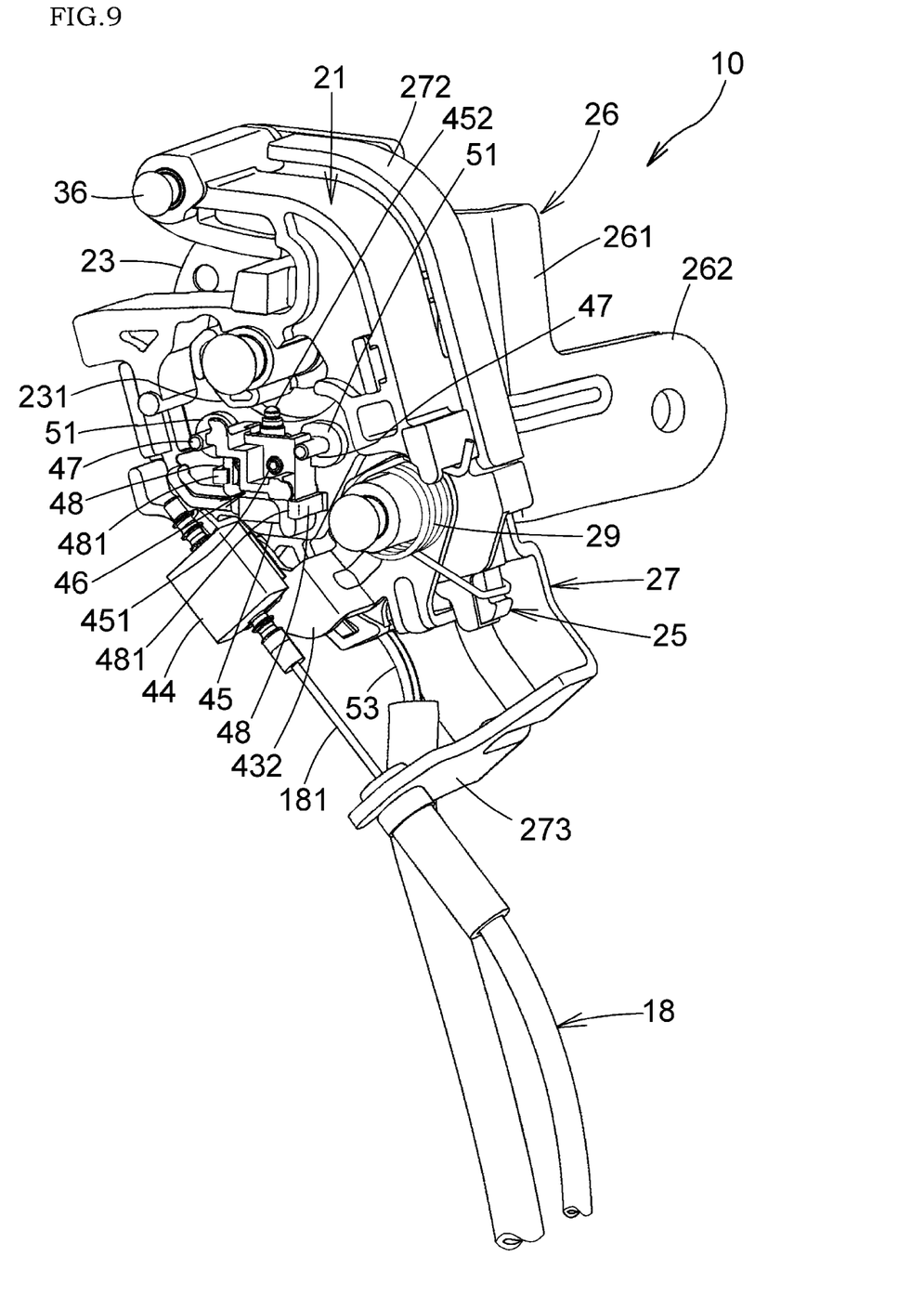
FIG. 9 is a perspective view of the vehicle upper door latch device viewed from the vehicle exterior side after mounting the limit switch.

As shown in FIGS. 8 and 9 (the rear base member 28 is not shown), a limit switch 45 which is turned on and off by the rotation of the latch 23 is mounted on the rear face of the body 21 through a holding member 46 made of a synthetic resin as follows.

Below the latch shaft 22 on the rear surface of the body 21, a pair of fitted projections 47, 47 spaced apart in the direction of the vehicle interior and exterior and a pair of elastic engaging portions 48, 48 having retaining claws 481 facing inward each other at the tip portion are integrally projected in the rear direction while being spaced apart in the vertical direction.

On the surface (front surface) of the holding member 46 facing the limit switch 45, a holding groove 49 into which the limit switch 45 is fitted without any gap is formed in the vertical direction. In addition, on both sides of the upper end portion interposing the holding groove 49, a pair of fitting portions 51, 51 having fitting holes 50, 50 which can be fitted to a pair of fitted projections 47, 47 are protruded toward the direction of the vehicle interior and exterior.

Further, in the central portion of the holding member 46, a pair of fitting holes 52, 52 into which a pair of projections 451, 451 protruded on the rear surface of the limit switch 45 are fitted are formed.

In order to mount the limit switch 45 and the holding member 46 to the body 21, first, while fitting the limit switch 45 into the holding groove 49 of the holding member 46, a pair of projections 451 and 451 of the limit switch 45 are fitted into a pair of fitting holes 52 and 52 of the holding member 46, the limit switch 45 is held by the holding member 46 while preventing the movement of the limit switch 45 in the vertical direction and the direction of the vehicle interior and exterior.

Next, as shown in FIG. 9, the fitting holes 50, 50 provided in a pair of fitting portions 51, 51 of the holding member 46 are fitted to a pair of fitted projections 47, 47 of the body 21, and while expanding a pair of elastic engaging portions 48, 48, the holding member 46 is pushed into the body 21 side, and the retaining claws 481 of the elastic engagement portions 48 are elastically engaged with the rear surfaces of both sides of the direction of the vehicle interior and exterior of the holding member 46. Thereby, on the rear surface of the body 21, the limit switch 45 can be stably mounted by the holding member 46, it is therefore not necessary to use fixing means such as screw.

After mounting the limit switch 45, an stretchable protrusion 452 can come in contact with the outer peripheral surface of a cam portion 231 provided on the rear surface of the latch 23, when the latch 23 rotates to the latch position in which the latch 23 engages with the upper striker 13, the protrusion 452 is pressed by the cam portion 231, the limit switch 45 is turned on or off, a closing signal of the rear door 5 from the upper door latch device 10 is inputted to a control circuit device (not shown) provided in the vehicle through a lead wire 53 connected to the limit switch 45. In addition, the closing signal is simultaneously input from a limit switch (not shown) provided in the lower door latch device 11 to the control circuit device, and it is judged that the rear door 5 was closed by the closing signals of the upper and lower limit switches.

As described above, in the upper door latch device 10 of the above-described embodiment, the front base member 26 is formed of the high tensile steel plate with high strength, and on the side edge of the vehicle exterior side thereof, since the reinforcing flange 261 extended downward from the extension portion of the striker entering groove 26a, and bent at a right angle or substantially right angle to the entry direction X of the upper striker 13 into the striker entering groove 26a is provided so as to be continuous with the first front side mounting portion 262, the bending rigidity of the side end portion of the vehicle exterior side of the front base member 26 including the first front side mounting portion 262 is enhanced.

For that reason, in particular, when a large tensile load acts on the upper door latch device 10 from the upper striker 13 in the vehicle rear direction or in the vehicle inward direction at the time of a vehicle collision, the side end portion of the vehicle exterior side of the front base member 26 which is the fixed portion side of the inner panel 5a of the rear door 5 is prevented from being excessively deformed and damaged. Therefore, there is no need to increase the bending rigidity of the front base member 26 by making the thickness of it to be particularly large or by welding reinforcing plates to it, and it becomes possible to downsize and be made lightweight the upper door latch device 10 and further to eliminate the welding process and the manufacturing process of reinforcing plates, so that the cost can be reduced.

In addition, since the rear base member 28 is also formed of the high tensile steel plate with high strength, when a large tensile load acts on the upper door latch device 10 from the upper striker 13 in the vehicle front direction or in the vehicle inward direction, the side end portion of the vehicle exterior side of the rear base member 28 which is the fixed portion side of the inner panel 5a of the rear door 5 is prevented from being excessively deformed and damaged. Therefore, there is no need to increase the bending rigidity of the rear base member 28 by making the thickness of it to be particularly large or by welding the reinforcing plate, and it is possible to further downsize and be made lightweight of the upper door latch device 10.

Further, since the front base member 26 and the rear base member 28 are made of a single material which is not reinforced by reinforcing plates, for example, at the time of a vehicle collision, by applying a large tensile load to the upper door latch device 10 in the vehicle outer direction (the direction in which the latch 23 is pulled by the upper striker 13), when a bending load acts on the vicinity of the bent portion between the first front side mounting portion 262 of the front base member 26 and the rear side mounting portion 282 of the rear base member 28, these parts can be deformed. As a result, the tensile stress is dispersed, and the stress is not concentrated in the vicinity of the caulking portion of the latch shaft 22 to the front base member 26 and the rear base member 28, so that the caulking portion of the latch shaft 22 is prevented from being excessively deformed and broken.

In addition, the components of the present invention described above are determined based on the result of verification together with the actual strength test so that the stress can be dispersed by CAE (Computer Aided Engineering) analysis using the function of CATIA Version 5 Analysis & Simulation manufactured by Dassault Systemes S.A.

By providing the cover member 27 formed of a high tensile steel plate between the front base member 26 and the body 21, the bending rigidity in the front-rear direction of the front base member 26 can be enhanced.

In addition, since the upper end portions of the body 21, the front base member 26, the cover member 27, and the rear base member 28 are connected by the connecting shaft 36 whose both ends are fixed to the front base member 26 and the rear base member 28 by caulking, the strength of the upper portion of the upper door latch device 10 is increased.

As described above, in the upper door latch device 10 according to the present embodiment, it is also possible to be made lightweight while maintaining the necessary strength requirement.

Although the embodiments of the present invention have been described above, the following various variations and modifications may be possible to the present embodiment without departing from the gist of the present invention.

In the above embodiment, although the cover member 27 is provided between the front base member 26 and the body 21, this cover member 27 may be omitted. In this case, a cable support portion of the upper Bowden cable 18 may be provided by extending a part of the front base member 26 downward.

In addition, in the above embodiment, although all three of the front base member 26, the cover member 27, and the rear base member 28 are formed of a high tensile steel plate, one of them, for example, only the front base member 26 may be formed of a high tensile steel plate and the other two may be formed of, for example, a cold rolled steel plate, or the front base member 26 and the rear base member 28 may be formed of a high tensile steel plate and the cover member 27 may be formed of such as a cold rolled steel plate.

The upper door latch device of the present invention may also be applied to a double hinged door provided at the rear portion of the vehicle body.

What is claimed is:
1. A vehicle upper door latch device provided in an upper part of a double hinged door provided in a vehicle body, the device comprising:
  a body;

a first metal base member provided on one side of the body and having a first mounting portion that can be fixed to the door;

a second metal base member provided on the other side of the body and having a second mounting portion that can be fixed to the door;

a latch shaft passing through the body and having both ends supported by the first metal base member and the second metal base member;

a latch disposed in the body, pivotally mounted on the latch shaft and being able to be engaged with a striker on a side of the vehicle body;

a ratchet shaft having both ends supported by the first metal base member and the second metal base member; and a ratchet disposed in the body, pivotally mounted on the ratchet shaft and engageable with the latch;

wherein the first metal base member has a reinforcing flange extending downward from an extension portion of a striker entering groove into which the striker enters in a direction to engage with the latch, the reinforcing flange is bent at a right angle, or at substantially right angle, to the entry direction of the striker into the striker entering groove, and the first mounting portion is continuous with a lower portion of the reinforcing flange and is formed longer than the reinforcing flange in the front direction.

2. The vehicle upper door latch device of claim 1, wherein both ends of the latch shaft and the ratchet shaft are fixed, by caulking, to the first metal base member and the second metal base member, respectively.

3. The vehicle upper door latch device of claim 1, wherein the first metal base member is formed by a single member including the first mounting portion and the second metal base member is formed by a single member including the second mounting portion.

4. The vehicle upper door latch device of claim 1, wherein a metal cover member, covering one side of the body, is disposed between the first metal base member and the body, and a support portion for supporting an upper portion of a motion transmitting member, for rotating the ratchet in a direction to release engagement with the latch, is provided at a lower portion of the metal cover member.

5. The vehicle upper door latch device of claim 4, wherein upper end portions of the body, the first metal base member, the metal cover member, and the second metal base member are connected by a connecting shaft in which both ends are fixed by caulking to the first metal base member and the second metal base member.

6. The vehicle upper door latch device of claim 5, wherein at least one of the first metal base member, the metal cover member, and the second metal base member is formed of a high tensile steel plate.

7. The vehicle upper door latch device of claim 1, wherein a third mounting portion, extending toward a side of the first metal base member and located below the first mounting portion, is integrally formed with a lower portion of the second metal base member.

* * * * *